United States Patent [19]

Gruenberg

[11] Patent Number: 4,805,216
[45] Date of Patent: Feb. 14, 1989

[54] METHOD AND APPARATUS FOR CONTINUOUSLY ACKNOWLEDGED LINK ENCRYPTING

[75] Inventor: Elliot L. Gruenberg, W. New York, N.J.

[73] Assignee: CompFax Corporation, W. New York, N.J.

[21] Appl. No.: 1,402

[22] Filed: Jan. 8, 1987

[51] Int. Cl.⁴ ............................................. H04L 9/04
[52] U.S. Cl. ...................................... 380/21; 380/33; 380/47
[58] Field of Search ................... 380/21, 33, 47, 20, 380/25

[56] References Cited

U.S. PATENT DOCUMENTS

| | | | |
|---|---|---|---|
| 2,406,841 | 9/1946 | Levy | 380/21 |
| 3,746,799 | 7/1973 | Gentges | 380/33 |
| 4,074,066 | 2/1978 | Ehrsam et al. | 380/25 |
| 4,228,321 | 10/1980 | Flanagan | 380/33 |
| 4,397,034 | 8/1983 | Cox et al. | 380/33 |
| 4,401,854 | 8/1983 | Steele | 380/21 |
| 4,484,027 | 10/1984 | Lee et al. | 380/21 |
| 4,613,901 | 9/1986 | Gilhousen et al. | 380/21 |
| 4,633,037 | 12/1984 | Serpell | 380/47 |
| 4,638,120 | 1/1987 | Herve | 380/47 |
| 4,713,840 | 2/1988 | Mniszewski et al. | 380/21 |
| 4,736,422 | 4/1988 | Mason | 380/21 |

Primary Examiner—Salvatore Cangialosi
Attorney, Agent, or Firm—Lieberman, Rudolph & Nowak

[57] ABSTRACT

The method and apparatus of the invention described herein provide confidential communications between two or more stations whereby the exchanged messages themselves provide the necessary enciphering keys for the messages to be encrypted and transmitted from each respective station. A full duplex communications loop is utilized between stations and the messages are exchanged substantially simultaneously.

12 Claims, 4 Drawing Sheets

FIG. 4a

| A | B | C |
|---|---|---|
| 0 | 0 | 0 |
| 0 | 1 | 1 |
| 1 | 0 | 1 |
| 1 | 1 | 0 |

FIG. 4b

| C | B | A |
|---|---|---|
| 0 | 0 | 0 |
| 1 | 1 | 0 |
| 1 | 0 | 1 |
| 0 | 1 | 1 |

FIG. 4c

| B | A | D |
|---|---|---|
| 0 | 0 | 0 |
| 1 | 0 | 1 |
| 0 | 1 | 1 |
| 1 | 1 | 0 |

FIG. 4d

| D | A | B |
|---|---|---|
| 0 | 0 | 0 |
| 1 | 0 | 1 |
| 1 | 1 | 0 |
| 0 | 1 | 1 |

FIG. 4e

| C | D | A |
|---|---|---|
| 0 | 0 | 0 |
| 1 | 1 | 0 |
| 1 | 1 | 0 |
| 0 | 0 | 0 |

METHOD AND APPARATUS FOR CONTINUOUSLY ACKNOWLEDGED LINK ENCRYPTING

FIELD OF THE INVENTION

The present invention relates to an apparatus and method whereby confidential information can be sent over public or private communications facilities in encrypted form without the use of a pre-determined encoding signal. Such an encoding signal is known in the art as a "key" and is electronically added to the confidential information prior to transmission, in order to encode or encrypt the information, preventing unauthorized interception of the information. Upon reception, the identical key is electronically combined with the received message in order to decode or decrypt the information by separating it from the key.

DESCRIPTION OF THE PRIOR ART

Prevention of unauthorized access to information, can be effected by encoding information prior to transmitting it over public or unsecured private transmission media. As described in the prior art, a simple way to so encode such information is to perform simple modulo-2 addition of the information sought to be encoded to a key signal, character, or series of characters. This can be accomplished using EXCLUSIVE OR logic gates such as the standard TTL 7486 Quad EXCLUSIVE OR gate manufactured by companies like National Semiconductor Corporation, 2900 Semiconductor Drive, Santa Clara, Calif.

The result of the EXCLUSIVE OR logical operation is shown in the truth table below.

| A | B | C |
|---|---|---|
| 0 | 0 | 0 |
| 0 | 1 | 1 |
| 1 | 0 | 1 |
| 1 | 1 | 0 |

Cyrptographic systems generally use to different type key signals; private keys and public keys. In private key type systems, a key is prearranged between the parties and sent by the originating party, either by messenger or some other private means, to the party who will receive the encrypted message. The originating party then encrypts the confidential message and transmits it in encoded form over public or private communications links. The receiving party will then use the prearranged key to decode the encrypted message.

If a series of bits comprising digital message A is 1010 and the key B is a series of bits, 1100, EXCLUSIVE-ORing each respective bit of message A with key B at the transmitting station, results in encrypted message C, 0110, being generated. If message C is then EXCLUSIVE OR'd with key B at the receiving station, message A can be decoded (i.e. 1010).

The problem with the private key type of encryption system is that a prearranged key requires prearranged communication. In other words, spontaneous messages cannot be sent between different parties without first somehow communicating to the receiving party the encryption key.

In order to overcome the problems inherent in a private key type system, a public key system can be used whereby the sending and receiving parties each use a separate public key for enciphering and a private key for deciphering. Each party sends messages encoded with the receiver's publicly available enciphering key and deciphers the messages received using his own private deciphering key. Possession of the deciphering key, however, enables any eavesdropper to decipher a message. The use of the public key system is, therefore, more vulnerable to such eavesdropping than the use of a private key system because the public enciphering key is not easily changed once it is widely published.

The present invention describes a system whereby no public key is necessary, and no private key need be prearranged prior to the actual transmission of messages. The system described herein, is a system of full duplex communication between stations whereby the exchanged messages themselves provide the necessary enciphering keys for the messages to be encrypted and transmitted from each respective station. The message originating at each respective station provides the necessary deciphering key for the message being received from the other station.

It is therefore an object of the instant invention to provide a cryptographic system for confidential exchange of information over public communication systems which does not require the use of a public or prearranged private key.

It is a further object of the invention to provide secure bidirectional communications, relatively inexpensively.

It is a still further object of the invention to provide an encryption system which is easy to use.

SUMMARY OF THE INVENTION

In the embodiment described herein, messages are sent in binary form. Bit synchronization protocol is provided by standard communications terminal equipment used in conjunction with the instant invention, and is added and deleted to the respective messages independent of the present encryption/decryption method. Such protocols are well-known in the art, and the synchronizing signals are used to synchronize timing means contained in the terminal hardware of both the sending and receiving stations so that the receiving station recognizes the bits of data sent by the transmitting station in the same sequence, or time compensated sequence, in which they are sent.

In the preferred embodiment of the invention, two communications paths are generally used at all times. This is well known in the art as full duplex communications. One path is used to transmit a signal from station X to station Y, the second path is used to transmit a second signal from station Y to station X.

In the present invention, transmission and reception of both signals by each respective station generally must be substantially simultaneous along both paths in order for successful encryption and decryption to take place. Each character or information word is composed of binary bits. Both stations continuously transmit material to the opposite station of a bit by bit basis; in each respective station, a previously transmitted bit of information serving as a decoding key for the most recently received bit of information, and said received bit in turn serving as the encoding key for the next bit to be transmitted.

It is therefore a feature of the present invention to provide the confidential exchange of information between stations by utilizing a full duplex communication system.

It is another feature of this invention that the key used to encode the message to be transmitted by each respective station is the received and decoded message from the opposite station.

It is a still further feature of the invention that the key used to decode the message received at each station is the message originating at each respective station.

It is a further feature of this invention that it can be used in conjunction with other methods of scrambing and descrambling to enhance the security of the messages.

These and other objects and features of the present invention will become more apparent when taken in conjunction with the following description and drawings wherein like characters indicate like parts, in which drawings form a part of the present specification.

BRIEF DESCRIPTION OF THE DRAWINGS

FIG. 4 is a series of truth tables (a)-(e) relating to FIGS. 1 and 2.

DESCRIPTION OF THE INVENTION

Figure 1:
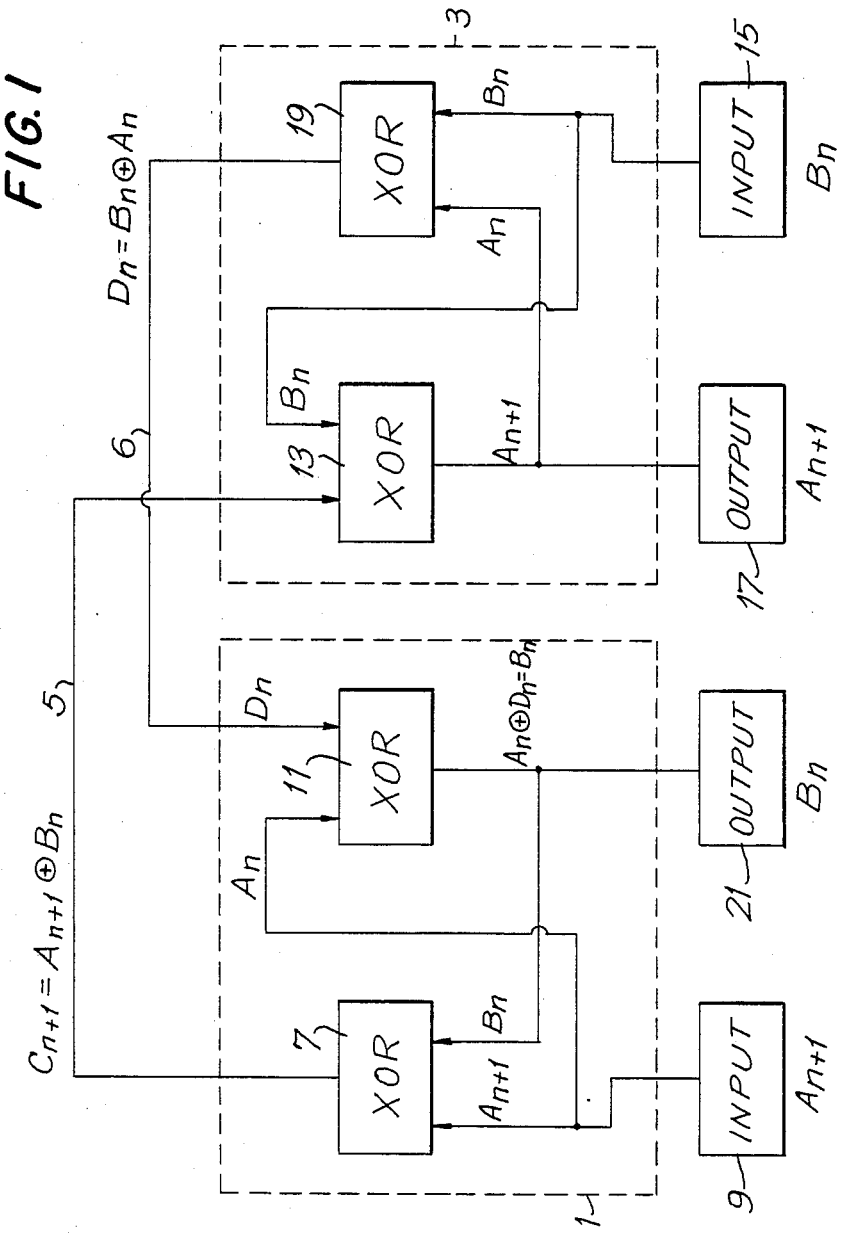
FIG. 1 is a block diagram of a basic embodiment of the present invention.

Standard communications terminals are used to interface each station with the respective communications lines and are not included in the description below. Circuitry for, and discussion of bit synchronization protocol included in the communications terminals of both stations is well known in the prior art and therefore omitted herein for the sake of brevity.

In the drawings, EXCLUSIVE OR gates 7, 11, 13 and 19 are used as mixers for various signals and provide the means for encrypting and decrypting the signals. The words encode, encoded and encoding are used herein toe describe the process of encryption and the words decode, decoded and decoding are used to describe the process of decryption. The symbol $\oplus$ is used herein to describe the EXCLUSIVE OR logical operation. We will assume for purposes of this description, that station X 1 seeks to establish communication with station Y 3. Station X 1 initiates this communication by transmitting a binary data stream, comprising signal A to station Y 3, along line 5.

Signal A, a first bit sequence initially consisting of random data of a nonconfidential nature, is input to station X 1 at input 9. Station Y 3 has not yet begun transmitting and therefore no incoming signal over line 6 is being received by station X 1 at this point. EXCLUSIVE OR gate 11 includes switch circuitry well known in the art, so that it will not function unless a signal is detected on line 6. Similarly, EXCLUSIVE OR gate 13 in station Y 3 will not function until a signal is received along line 5.

With no signal present on line 6, decoding EXCLUSIVE OR gate 11 is not functioning and therefore only signal A is input to encoding EXCLUSIVE OR gate 7. Signal B, a second bit sequence, is generated at input 15.

Signal C a third bit sequence results from the logical mixing in gate 7 of signal A and the output of gate 11. When no signal is detected on line 6 by station X 1, the output of gate 11 therefore is a logical "0" and signal C equals input signal A.

Signal C is transmitted over line 5 to station Y 3 and mixed with signal B by decoding EXCLUSIVE OR gate 13. Gate 13 becomes active only upon detection of incoming signal C on line 5. Since signal B still has not be inputted at input 15 of station Y 3, the output of gate 13 is equal to signal A. Up to this point, signal A has been sent completely in the clear, i.e. with no encryption, due to the absence of signal B.

Station Y 3, therefore, initially begins reception of the random data bits comprising signal A, as output 17 from gate 13.

When signal A is detected at output 17, signal Y 3 begins transmission of signal B, input at 15. Signal B, a binary data stream, can either be a meaningful message or a random data. In either case, it will be mixed with the received data of signal A on a bit by bit basis by being EXCLUSIVE OR'd in encoding gate 19, prior to being sent to station X 1 as data stream signal D, a fourth bit sequence via line 6.

As indicated in FIG. 1, bit $A_n$ of signal S, is EXCLUSIVE OR'd with bit $B_n$ of signal B, in gate 19. The output of gate 19, bit $D_n$ is therefore equal to $B_n \oplus A_n$, and it is transmitted to station X 1 via line 6.

At station X 1, upon detection of signal D on line 6, gate 11 is activated and bit $D_n$ is EXCLUSIVE OR'd with bit $A_n$ by gate 11. $D_n$ equals $B_n \oplus A_n$. The output of gate 11 is, therefore, $(B_n + A_n) + A_n$ which equals $B_n$ which, thus decoded, is available at output 21.

When station X 1 thereby begins reception of data stream B, it begins to use the decoded bits of signal B to encode subsequent bits of signal A. At this time, Station X1 could begin sending message bits rather than random data bits.

The next bit of data stream A, bit $A_{n+1}$ is EXCLUSIVE OR'd with bit $B_n$ by gate 7 yielding bit $C_{n+1}$, which equals $(A_{n+1}) \oplus B_n$, which is transmitted to station Y 3 over line 5. At station Y 3, $C_{n+1}$ is EXCLUSIVE OR'd with bit $B_n$ in gate 13, yielding decoded bit $A_{n+1}$ at output 15.

The process continues in the same manner for each subsequent bit of signals A and B, until both messages have been completely exchanged.

As long as both stations continue to transmit substantially simultaneously to each other, data streams C and D will remain encrypted.

In order for security to be maintained, the transmission and reception of signals between stations X 1 and Y 3, and the encoding and decoding of gates 7, 11, 13, and 19 must take place on a bit by bit basis, substantially simultaneously. As used herein, substantially, simultaneously means transmission of message bits between stations during a common time interval, each message being encoded, bit-by-bit, by the other message during such common time interval when taking into account, initial start-up delay and delay times caused by the distance between stations and circuit limitations. It is, of course, understood that storage means and/or delay means, could be used at each station for temporary storage of message bits, as long as encoding and decoding occur on a bit-by-bit basis.

Figure 2:
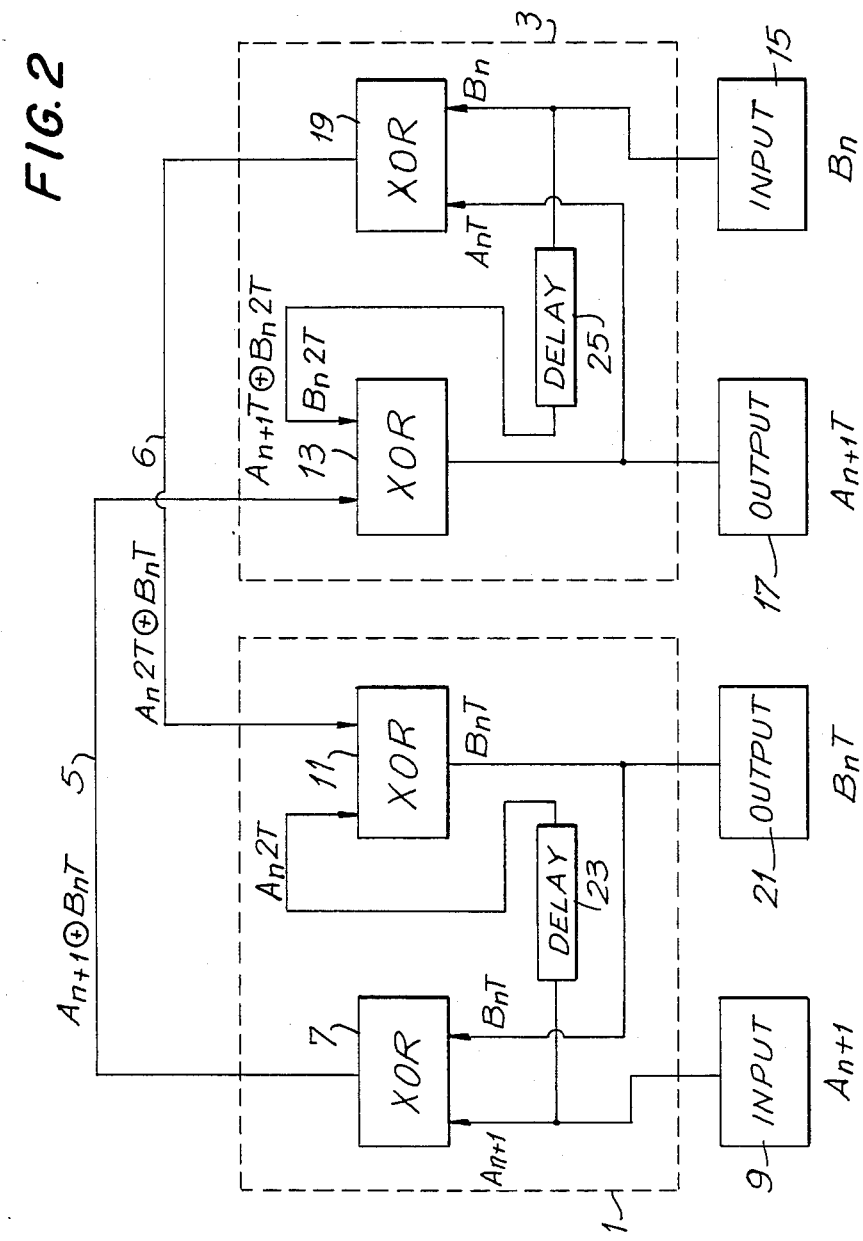
FIG. 2 is a block diagram of a preferred embodiment of the present invention.

FIG. 2 describes a preferred embodiment of the invention, which includes means for the system to compensate for the transmission delay caused by the respective communications paths, i.e. distance, circuitry, etc.

To initialize communications, the originating station, in this example station X 1, must ascertain the round trip delay time between itself and station Y 3. This is measured by transmitting a signal along line 5 and measuring the delay time between transmission and reception of its echoed signal returned along line 6. This is done while station Y 3 is silent. The method of calculating this delay time is well known in the art. For this example, we will assume that the total roundtrip time is 2T (T along both paths 5 and 6) although the time for transmission along path 5 (T) can be different from the transmission time along path 6 (t) resulting in a round trip time of T +t.

Station X 1 adjusts its delay means 23 to reflect a delay of 2T. The delay means 23 and 25 can be shift registers, charge coupled devices, magnetic core, tape, disk or diskette media, acoustical delay means or other suitable storage means. The delay means can also be implemented by a programmable microprocessor which would be programmed in a manner well known in the art to perform a signal delay function. The delay time of each of these delay means can be adjusted according to methods well known in the art.

Unless the stations are separated by a large distance, 2T will generally equal only fractions of a second.

After station X 1 adjusts its delay means 23, it ceases transmission and station Y 3, goes through the same process to determine 2T, in order to set its own delay means 25 to reflect a delay of 2T.

Once station Y 3 adjusts its delay means 25, it ceases transmission. Station X 1 and station Y 3 now begin to exchange signals A and B respectively.

For purposes of following the description, assume that messages are being exchanged between the stations and that $A_n t$ (bit n of signal A, as delayed by transmission time T), has been received by station Y 3, decoded by gate 13 and used to encode bit $B_n$ of signal B, as inputted to both delay means 25 and gate 19. It is also present at output 17 as one decoded bit of signal A.

As indicated in FIG. 2, gate 19 EXCLUSIVE OR's bit $A_n T$ with bit $B_n$. $A_n T \oplus B_n$ is transmitted to station X 1 over line 6. In time T, $A_n 2T \oplus B_n T$ ($A_n T \oplus B_n$ delayed by T), is received at station X 1 and inputted to gate 11. The output from delay means 23, $A_n 2T$ ($A_n$ delayed by 2T), is also inputted to gate 11 and is therein EXCLUSIVE OR'd with $A_n 2T \oplus B_n T$ yielding $(A_n 2T \beta B_n T) \oplus A_n 2T$, which equals $B_n T$, (i.e. decoded bit $B_n$ delayed by time T) and present at output 21 as one decoded bit of signal B.

Station X 1 continues to input subsequent bits of signal A at input 9. Bit $A_{n+1}$ is inputted into gate 7 where it is EXCLUSIVE OR'd with bit $B_n T$, yielding $A_{n+1} \oplus B_n T$. $A_{n+1} \oplus B_n T$ is transmitted over line 5 to Station Y 3 in time T and is received as $A_{n+1}T \oplus B_n 2T$. $A_{n+1}T \oplus B_n 2T$ is EXCLUSIVE OR'd in gate 13, with the output of delay means 25, which is $B_n 2T$, (bit Bn delayed time 2T). Therefore, the input to gate 13 is $(A_{n+1}T \oplus B_n 2T) \oplus B_n 2T$. The output of gate 13 is decoded bit $A_{n+1}$ delayed by time T and appears at output 17.

Figure 3:
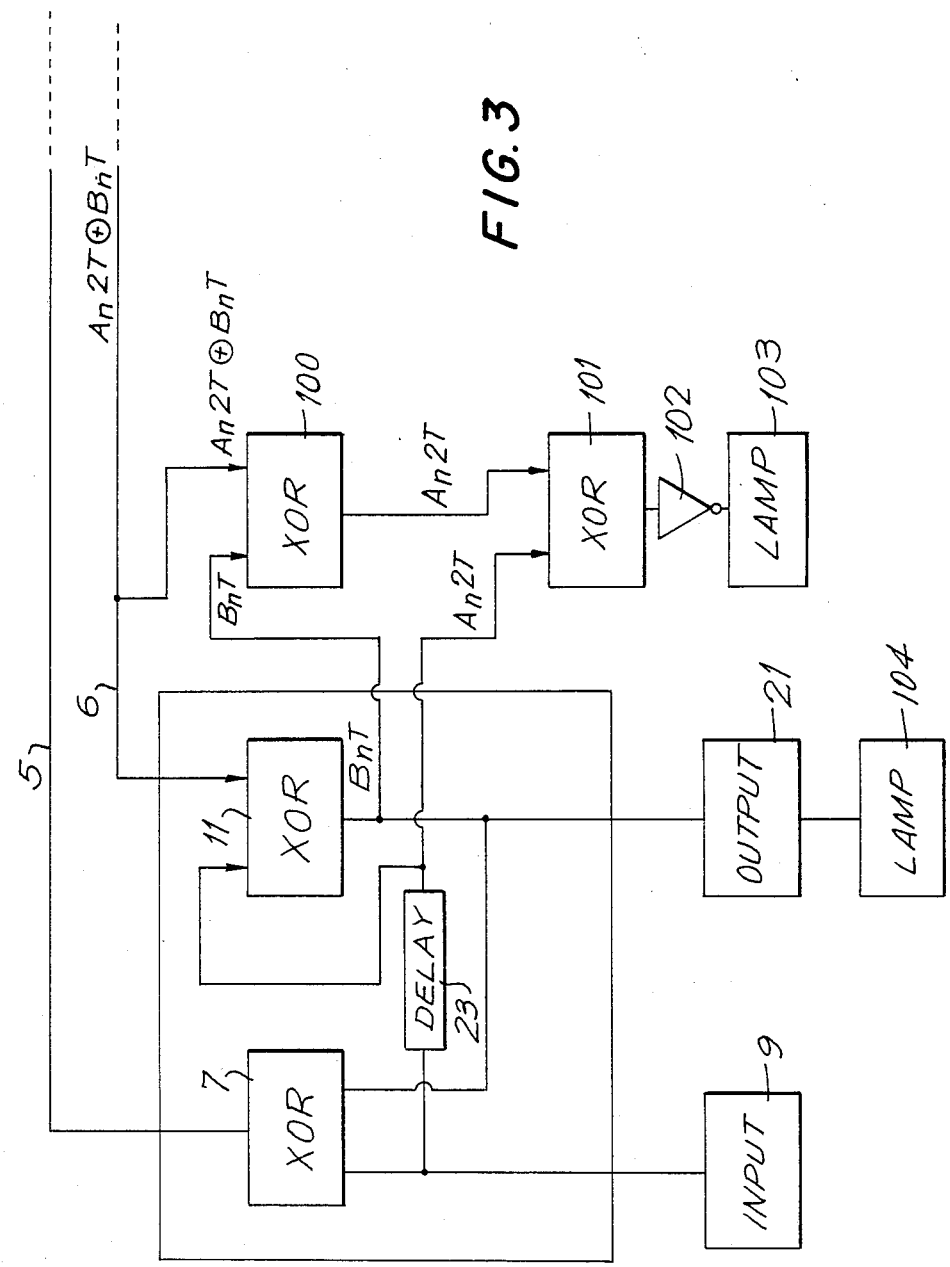
FIG. 3 is a block diagram of one station pictured in FIG. 2, with the addition of apparatus for indication of the proper setting of the delay means and the indication of an incoming message.

FIG. 3 adds to the embodiment described in FIG. 2, means by which each station can adjust its respective delay means without the other side halting its transmission. This is accomplished by connecting EXCLUSIVE OR gates 100 and 101, and inverter 102 as indicated. The output of inverter 102 is attached to lamp 103, which can also be an audible alarm.

The output of gate 11, $B_n T$ (which is decoded bit $B_n$ of signal B delayed by time T) is input to gate 100 along with the encoded signal $A_n 2T \oplus B_n T$ being transmitted from station Y 3 over communications path line 6, to station X 1.

The output of gate 100, $B_n T \oplus (A_n 2T \oplus B_n T) = A_n 2T$. This output is one input to gate 101. The output of delay means 23, $A_n 2T$ is the other input to gate 101. The output of gate 101 is connected to inverter 102. The output of the inverter 102 is connected to lamp 103.

When both of the inputs of gate 101 (i.e. $A_n 2T$ are the same) the output of gate 101 will be a logical "0". The logical "0" is inverted by inverter 102 and the resulting logical "1" causes lamp 103 to turn ON. Delay means 23 is adjustable and is adjusted until lamp 103 remains on indicating that delay means 23 has been set properly to match the delay introduced to the stored bit of signal A, to the roundtrip transmission time delay introduced by lines 5 and 6, i.e. 2T. When properly calibrated, time delay means 23 assures that received encoded bit $B_n$ is mixed with the same bit of signal A was used in Station Y 3 therein as a key for encoding bit $B_n$ prior to its transmission over line 6.

Means for visually indicating an incoming message is accomplished by attaching lamp 104 to output 9.

Pulse extending means, not shown in the diagram, can be inserted between gate 102 and lamp 103, and between output 9 and lamp 104 in order to prevent flickering which might confuse the status indication.

FIG. 4(a) shows the truth table for EXCLUSIVE OR gate 7. FIG. 4(b) shows the truth table for EXCLUSIVE OR gate 13. FIG. 4(c) shows the truth table for EXCLUSIVE OR gate 19. FIG. 4(d) shows the truth table for EXCLUSIVE OR gate 11. FIG. 4(e) shows the truth table for lines 5 and 17, assuming they were intruded upon and an attempt was made to EXCLUSIVE OR their data in order to ascertain either message A or B.

Lines 5 and 6 cannot be logically combined to yield any usable information.

Although specific embodiments of this invention have been shown and described, it will be understood that various modifications may be made without departing from the spirit of this invention.

I claim:

1. A method of transmitting secure messages between a plurality of locations, comprising the steps of, generating a first sequence of message bits originating in a first location, each bit of which is mixed at said first location with a bit of a second sequence of message bits received from a second location, said mixed first and second bits at said first location establishing a third sequence of bits, said third sequence of bits being transmitted to said second location wherein each bit of said third sequence of bits is mixed with each bit of said second sequence of message bits, whereby said first sequence of message bits is derived at said second location, each bit of said first sequence of message bits being mixed with said second sequence of message bits at said second location, said mixed first and second bits at said second location establishing a fourth sequence of bits, said fourth sequence of bits being transmitted to said first location wherein each bit of said fourth sequence of bits is mixed with each bit of said first sequence of message bits, whereby said second sequence of message bits is derived at said first location, each mixing step occurring on a bit-by-bit basis.

2. Apparatus for transmitting secure messages between a plurality of locations, comprising;
   means at a first location, for mixing each bit of a first sequence of message bits generated at said first location with each bit of a second sequence of message bits generated at and received from a second location in order to generate a third sequence of bits for transmission to said second location;

means at said second location for mixing each bit of said third sequence of bits with each bit of said second sequence of message bits, whereby said first sequence of message bits is derived at said second location;

means at said second location, for mixing each bit of said first sequence of message bits with each bit of said second sequence of message bits to generate a fourth sequence of bits for transmission to said first location; and means at said first location for mixing each bit of said fourth sequence of bits with each bit of said first sequence of message bits whereby said second sequence of message bits is derived at said first location.

3. Apparatus in accordance with claim 2, wherein there is further included delay means for determining and inserting a predetermined amount of delay prior to mixing bit sequences at said first and second locations.

4. The apparatus of claim 3, wherein the delay means includes an adjustable delay time.

5. The apparatus of claim 4 wherein the delay means includes a shift register.

6. The apparatus of claim 4 wherein the delay means includes a charge coupled device.

7. The apparatus of claim 4 wherein the delay means includes a programmable microprocessor.

8. The apparatus of claim 4 wherein the delay means includes a magnetic disk drive.

9. The apparatus of claim 4 further comprising means for indicating an incoming signal.

10. The apparatus of claim 4 further comprising means for indicating that the delay means is adjusted to a desired delay time.

11. A method for the secure exchange of first and second message bit sequences between first and second stations over first and second communications paths, comprising the steps of:

(a) in the first station, generating encrypted bit A by mixing bit A of the first bit sequence with bit B-1 of the second bit sequence received from the second station;

(b) transmitting encrypted bit A as part of a third bit sequence from the first station to the second station;

(c) receiving encrypted bit A of the third bit sequence at the second station and generating decrypted bit A of the first bit sequence by mixing the third bit sequence therein with bit B-1 of the second bit sequence;

(d) in the second station, generating a fourth bit sequence of encrypted bit B by mixing bit B of the second bit sequence with decrypted bit A of the first bit sequence;

(e) transmitting encrypted bit B as the fourth bit sequence from the second station to the first station;

(f) receiving encrypted bit B of the fourth bit sequence at the first station and generating decrypted bit B of the second bit sequence by mixing the fourth bit sequence therein with bit A of the first bit sequence;

(g) incrementing A by one, and, at the first station, mixing bit A of the first bit sequence with decrypted bit B of the second bit sequence;

(h) incrementing B by one; and (i) repeating steps (a) through (h) until A equals at least n and B equals at least n.

12. The method of claim 11 whereby the mixing of first and second signals is accomplished by logically EXCLUSIVE ORing them.

* * * * *